United States Patent
Kenyon et al.

(10) Patent No.: US 6,433,273 B1
(45) Date of Patent: Aug. 13, 2002

(54) HEAT-SHIELDING JACKET

(75) Inventors: David M. Kenyon, Santa Ana; Vernon L. Shrader, Lake Forest; Walter A. Plummer, III, Santa Ana, all of CA (US)

(73) Assignee: The Zippertubing Co., Los Angeles, CA (US)

( * ) Notice: Subject to any disclaimer, the term of this patent is extended or adjusted under 35 U.S.C. 154(b) by 0 days.

(21) Appl. No.: 09/693,711

(22) Filed: Oct. 20, 2000

(51) Int. Cl.$^7$ .............................. H01B 7/34; H01B 7/00
(52) U.S. Cl. ................ 174/36; 174/110 R; 174/120 R; 174/122 R; 174/122 G
(58) Field of Search ............................... 174/36, 117 F, 174/109, DIG. 8, 74 A, 102 R, 110 R, 120 R, 120 SC, 122 G, 122 R; 138/138

(56) References Cited

U.S. PATENT DOCUMENTS

| | | | | |
|---|---|---|---|---|
| 3,254,678 A | * | 6/1966 | Plummer | 138/139 |
| 3,321,572 A | * | 5/1967 | Garner | 174/105 |
| 3,467,761 A | * | 9/1969 | Plummer | 174/36 |
| 3,577,110 A | * | 5/1971 | Arntz | 336/175 |
| 3,770,556 A | * | 11/1973 | Evans et al. | 161/39 |
| 3,903,354 A | * | 9/1975 | Dageforde | 174/107 |
| 3,968,321 A | * | 7/1976 | Olszewski et al. | 174/36 |
| 4,054,710 A | * | 10/1977 | Botsolas | 428/228 |
| 4,327,246 A | * | 4/1982 | Kincaid | 174/36 |
| 4,376,393 A | * | 3/1983 | Smuckler | 428/99 |
| 4,454,379 A | * | 6/1984 | Cleveland et al. | 174/107 |
| 4,501,928 A | * | 2/1985 | Ishitobi | 174/107 |
| 4,631,098 A | * | 12/1986 | Pithouse et al. | 156/86 |
| 4,647,714 A | * | 3/1987 | Goto | 174/36 |
| 4,731,500 A | * | 3/1988 | Otsuka | 174/36 |
| 4,774,148 A | * | 9/1988 | Goto | 428/607 |
| 4,788,088 A | * | 11/1988 | Kohl | 428/34.5 |
| 4,791,236 A | * | 12/1988 | Klein et al. | 174/36 |
| 4,802,509 A | * | 2/1989 | Brandolf | 138/110 |
| 4,929,478 A | * | 5/1990 | Conaghan et al. | 428/35.1 |
| 5,034,251 A | * | 7/1991 | Read et al. | 428/34.9 |
| 5,134,000 A | * | 7/1992 | Smythe et al. | 428/34.9 |
| 5,178,923 A | * | 1/1993 | Andrieu et al. | 428/36.1 |
| 5,367,123 A | * | 11/1994 | Plummer, III et al. | 174/36 |
| 5,391,838 A | * | 2/1995 | Plummer, III | 174/36 |
| 5,411,777 A | * | 5/1995 | Steele et al. | 428/34.9 |
| 5,645,906 A | * | 7/1997 | Park et al. | 428/36.3 |
| 6,064,000 A | * | 5/2000 | Kim | 174/36 |

\* cited by examiner

Primary Examiner—Dean A. Reichard
Assistant Examiner—William H. Mayo, III
(74) Attorney, Agent, or Firm—Christie, Parker & Hale, LLP

(57) ABSTRACT

A closeable heat-shielding jacket is formed from a substantially impervious flexible sheet of polyurethane-coated woven glass fiber textile. The textile has a substantially continuous layer of polyester coated with a reflective layer of 10 aluminum adhered onto one face. A strip of acrylic pressure-sensitive adhesive is adhered along one edge of the aluminum layer for use in closing the heat-shielding jacket. The adhesive is selected to be resistant to continuous exposure to at least 120° C. The adhesive also has a thickness of at least 0.1 mm and is soft enough to conform to the textured surfaces of the heat-shielding material. The heat-shielding jacket material has a removable release layer over the strip of pressure-sensitive adhesive. This jacket material is wrapped around a wire bundle or the like, and the outside edge is overlapped over the inside edge, which has the strip of adhesive, the width of the adhesive strip to close the jacket with the shiny side out.

18 Claims, 1 Drawing Sheet

HEAT-SHIELDING JACKET

BACKGROUND OF THE INVENTION

There are numerous applications in automotive and aircraft structures, for example, where electrical wiring or other heat sensitive components pass near or through regions of relatively high temperature. Conversely, there are sometimes applications where tubing carrying a relatively high temperature fluid passes near components that may be subject to degradation at elevated temperature. In any of these applications, it may be desirable to provide heat shielding between high temperature regions and components, such as insulation on wiring, that may be subject to degradation.

This can be a significant issue for a wiring cable harness, for example, where a bundle of wires passes near a heat source such as an auto or truck exhaust header, turbocharger or the like. It may be necessary to apply heat shielding around the cable harness in only a relatively short portion of its total length. It is desirable to apply such a heat shielding after the harness is assembled so that connectors and the like do not need to be pulled through a heat-shielding tube. There are also situations where it is desirable to apply heat shielding in a retrofit application where wiring or tubing is already in place and heat shielding is to be added.

Heat shielding has previously been applied in tubular form in such situations by stitching tongue and groove or other closeable fasteners along the length of each edge of a sheet of heat-shielding material. For example, Velcro (TM) hook and loop fastener material may be stitched along opposite edges of a sheet. Such a sheet may then be wrapped around a cable harness or the like, and the edge connectors inter-engaged to form a tube of heat-shielding material around the wiring harness. Staples have also been used for connecting the edges of heat shielding. Wire or fiber ties may also be wrapped around the heat shielding to form a tube.

There can be drawbacks to such an arrangement due to the cost of the edge attachments and their stitching to the heat-shielding material. Furthermore, the stitching requires penetration of the heat-shielding material, leaving holes through which gases may flow and a potential line of weakness along which the heat-shielding material may fail. Any suitable heat-shielding material must have sufficiently robust high temperature properties to withstand the operating conditions in the automotive or other high temperature environment. For automotive applications in particular, cost is also an important consideration.

BRIEF SUMMARY OF THE INVENTION

There is, therefore, provided in practice of this invention, according to a presently preferred embodiment, a closeable heat-shielding jacket which is formed from a substantially impervious flexible sheet of polymer-coated woven glass fiber textile. The textile has a substantially continuous layer of reflective metal on one face. A strip of acrylic pressure-sensitive adhesive is adhered along one edge of the aluminum layer for use in closing the heat-shielding jacket. The adhesive is selected to be resistant to continuous exposure to at least 150° C. The heat-shielding jacket material has a removable release layer over the strip of pressure-sensitive adhesive.

BRIEF DESCRIPTION OF DRAWINGS

These and other features of the present invention will be appreciated as the same become better understood by reference to the following detailed description and the accompanying drawings wherein.

DETAILED DESCRIPTION OF THE INVENTION

Figure 2:
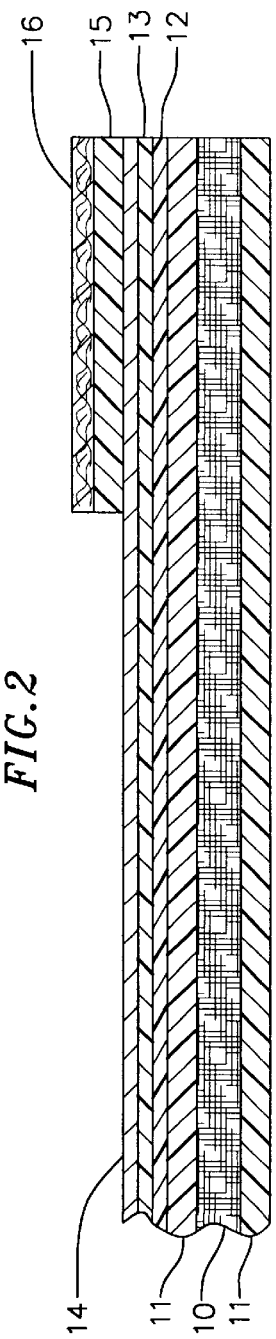
FIG. 2 illustrates in semi-schematic transverse cross section, an edge of a flat sheet which is wrapped for forming the heat-shielding jacket.

The heat-shielding jacket has as a structural core a layer of woven glass fiber textile 10. Each face of the glass fiber textile is coated with a polyurethane polymer layer 11. In the illustration of FIG. 2, the polymer layers are illustrated as if flat on the outside surfaces and on the surfaces adjacent to the glass fiber textile. It should be understood, however, that in an actual embodiment, the plastic layers are each so thin that the surface texture of the woven textile is readily apparent. One face of the heat-shielding sheet has a layer of metallized polyester 12 adhered onto the polymer layer by an acrylic adhesive 13. The metal 14 is illustrated with exaggerated thickness in the schematic cross section, as are all of the other layers illustrated in FIG. 2. As a schematic illustration, none of the layers are drawn to scale.

The metal layer has a shiny reflective surface which also follows the contours of the woven textile. The metal is preferably aluminum since readily applied by vacuum deposition and the polyester is preferably polyethylene terephthalate.

Figure 1:
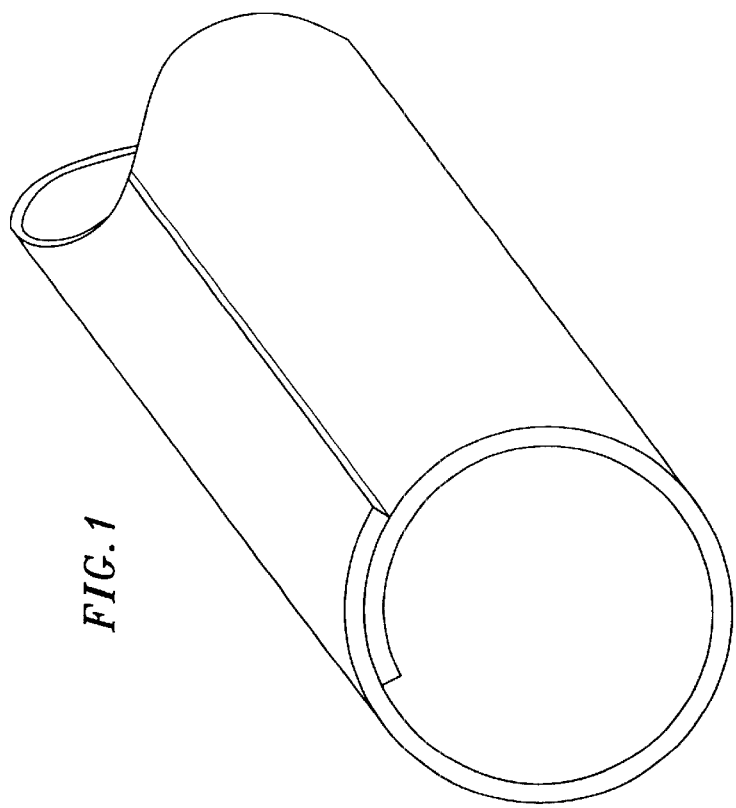
FIG. 1 illustrates a heat-shielding jacket in a partial perspective view.

The heat-shielding sheet is constructed nominally flat. Along one longitudinally extending edge, there is a strip of pressure-sensitive adhesive 15 adhered over the aluminum layer. A conventional silicone coated paper release layer 16 is applied over the pressure-sensitive adhesive. In a typical use of the heat shielding, the release layer is stripped off, exposing the pressure-sensitive adhesive. The sheet is then wrapped around a portion of a wire harness, for example, and the longitudinally extending edges are overlapped, as illustrated in FIG. 1 so that the pressure-sensitive adhesive strip adheres to the outside along one edge and the inside along the other edge to form a closed tube.

Typically, in such an embodiment, the heat-shielding sheet is wrapped so that the shiny aluminum layer is on the outside so as to reflect heat away from the wiring harness. If desired, the direction of wrapping can be reversed so that the shiny aluminum layer is on the inside and the bare polymer-coated face is on the outside. (Similarly, if desired, the layer of pressure-sensitive adhesive may be applied on the bare polymer-coated face instead of the aluminum coated face.)

A sheet of heat-shielding jacket material may be provided in precut lengths for specific applications or may be in rolls of indefinite length. The width of the sheet is appropriate for the desired diameter of closeable tube to be made with the sheet. For example, when one desires a closed heat-shielding jacket with a nominal diameter of 25 mm (1 inch), a sheet is cut to about 97 mm (3 3/16 inch) width and the strip of adhesive is about 12.5 mm (½ inch) wide. If a larger diameter shielding jacket is desired, a wider sheet may be used. If a smaller diameter is desired, one may overlap the edges of the sheet more than the width of the pressure-sensitive adhesive strip, although this is generally less desirable than employing a narrower sheet. It is preferred to have the outside edge of the sheet adhered to the inner edge just enough to overlap the pressure-sensitive adhesive rather than protruding beyond the adhesive where it may be inadvertently damaged or the seam peeled open.

In the illustrated embodiment, the pressure-sensitive adhesive is initially provided along the face of the sheet that will become the outside of the heat-shielding jacket. If the adhesive is applied along the face of the sheet that will become the inside of the jacket, the excess overlap beyond the width of the pressure-sensitive adhesive strip may be safely inside the heat-shielding jacket when the tube is smaller than the nominal maximum diameter. It is preferred to have the pressure-sensitive adhesive on the outside metallized face since wrapping and applying the jacket around wiring or the like is simplified.

Since the applications of the heat-shielding jacket are for resistance to elevated temperatures, it is important that the materials of construction are suitably heat resistant at the operating temperatures. Thus, the pressure-sensitive adhesive is selected to be resistant to continuous exposure to at least 120° C. The polymer-coated woven glass fiber textile desirably is durable at temperatures at least as high and preferably higher than the pressure-sensitive adhesive. There are automotive applications where greater heat resistance is desirable and it is particularly preferred that the pressure-sensitive adhesive have resistance to continuous exposure to at least 150° C. Such a material can serve in the most demanding applications and also less demanding applications without necessity of the user stocking different grades of material.

A suitable heat-shielding material is available from Zipper-Technik GmbH of Neu-Isenburg, Germany as Part No. ALP-500. This exemplary material is a glass fiber woven textile with an Atlas 1/3 weave. This weave has 19 threads per centimeter in the warp and 12 threads per centimeter in the weft. The base fiber textile has a weight of approximately 420 g/m$^2$ and the weight of the coated and metallized product is about 500 g/m$^2$. The thickness of the heat-shielding jacket material is nominally 0.4 mm. Such a material has a warp strength of more than 250 N/cm and a weft strength of more than 200 N/cm. One face of the polymer coated textile has a layer of polyester coated with reflective aluminum adhered to the textile. This layer is calendared to conform to the texture of the polymer coated textile. Typically, the coating weight to obtain the desired imperviousness and reflectivity is about 80 g/m$^2$. The glass fiber textile is coated with polyurethane having a heat resistance to at least 175° C. of continuous exposure and 230° C. transient exposure (minutes).

Other polymer coated woven glass fiber textile products are also available and may be usable in practice of this invention for specific applications. For example, reflective coated textiles having weights of 400 and 600 g/m$^2$ are also usable. Coated textiles of greater weight and strength up to about 1250 g/m$^2$ may be used where the applications demand it. Such heavy heat-shielding material may be used, for example, in trucking applications. Examples of other vendors of suitable materials include H.P. Darmstädter GmbH, of Wesel, Germany, Gentex Corp. of Simpson, Pa., Auburn Manufacturing Inc. of Mechanics Falls, Maine and RM Engineered Products, Inc. At least some of these materials, including the ALP-500 material, preexisted the making of this invention.

An exemplary pressure-sensitive adhesive suitable for use in the heat-shielding jacket has been identified as Product No. 9485PC adhesive transfer tape, available from 3M Corporation, St. Paul, Minn. The 9485PC pressure-sensitive adhesive is a firm acrylic material, which can be adhered with thumb pressure at application temperatures in the range of from about 20–40° C. The adhesive is soft enough to conform to the textured surface of the polymer coated textile and provide instant adhesion of ample strength. (Application to surfaces at temperatures below about 10° C. is not recommended, since the pressure-sensitive adhesive becomes too firm to conform to the textured surface and adhere readily.) The thickness preferred is 0.13 mm (5 mil) to assure a large contact area of adhesive to the textured surface of the polymer-coated textile. A thickness of at least about 0.1 mm seems appropriate for ease of conforming to the textured surfaces and obtaining adequate adhesion. Thicker layers of pressure-sensitive adhesive may be used, but generally speaking and within limits, thinner adhesive layers have better strength than thicker layers. The release liner over the pressure-sensitive adhesive is conventional moisture-resistant poly-coated paper. This adhesive has very good solvent resistance, good ultraviolet resistance, and sufficient bond strength when applied to the polymer-coated textile.

Ordinarily, the peel strength of adhesives is of importance, and these are the data reported by manufacturers. In this application for a heat-shielding jacket, a more important property is the lap shear strength. Peeling of the overlap joint is not as likely as hoop tension tending to shear the joint. Lap shear strength was measured using an inch wide joint with one half inch overlap, i.e. one half square inch of adhesive.

When applied between the faces of the shielding jacket made of the ALP-500 material, the lap shear strength is about 4.3 kg/cm$^2$ after 48 hours at room temperature. Bond strength can be accelerated by exposure of the bond to elevated temperatures, such as 65° C. for about one hour. The lap shear strength increases to about 9.3 kg/cm$^2$ after two weeks at 150° C.

Another suitable acrylic pressure-sensitive adhesive for less demanding applications is No. 9472LE, also available from 3M Company. Its lap shear strength after 48 hours at room temperature is about the same as the 9485PC adhesive and the strength increases to about 7 kg/cm$^2$ after two weeks exposure to 150° C. Other pressure-sensitive adhesives may also be used if they have adequate lap shear strength and temperature resistance. It is preferred that the pressure-sensitive adhesive have a lap shear strength that increases to at least 5 kg/cm$^2$ after exposure to 150° C. to provide ample strength for long term service.

It is preferred that the initial lap shear strength of the pressure-sensitive adhesive (tested after 48 hours at room temperature) is at least 1.5 kg/cm$^2$ so that wiring harnesses can be handled without damage before strength is augmented by exposure to elevated temperature. It is particularly preferred that the pressure-sensitive adhesive have a lab shear strength of at least 4 kg/cm$^2$ so that it is quite secure during rough handling after forming a heat-shielding jacket. Such a strength is also desirable since the initial strength, i.e. before 48 hours, is higher. It is also highly desirable that the adhesive have increased lap shear strength after exposure to elevated temperature. This not only provides the opportunity to strengthen the joint with short term exposure to an elevated temperature, but also assures excellent strength during prolonged service.

It should be apparent that materials having properties roughly equivalent to the polymer-coated glass fiber textile and pressure-sensitive adhesive may be substituted for the materials identified in the specific embodiments described above. Likewise, other heat resistant flexible polymers may be used for coating the glass fiber textile, such as a silicone resin, instead of polyurethane. Polyurethane is preferred for cost reasons. Other heat-resistant resins should also be apparent to those skilled in the art. Similarly, the preferred pressure-sensitive adhesive is a firm acrylic. A semi-firm acrylic or other heat-resistant pressure-sensitive adhesive composition may be substituted.

A significant result of the selection of components for the heat-shielding jacket is that the resulting tube is essentially impervious. The polymer-coated fabric is impervious, and it is not perforated by stitching or the like. The adhesive conforms to and has good adhesion to the textured surfaces. Thus, the adhesive helps seal along the length of the shielding jacket and maintain its impermeability. Furthermore, the joint made with a pressure-sensitive adhesive has a minimal thickness, appreciably less than with other fastening techniques.

What is claimed is:

1. A closeable heat-shielding jacket comprising:
   a substantially impervious flexible sheet of polymer-coated woven glass fiber textile;
   a substantially continuous layer of reflective metal on one face of the textile;
   a strip of pressure-sensitive adhesive adhered along one edge of the sheet, the adhesive being resistant to continuous exposure to at least 120° C.; and
   a removable release layer over the strip of pressure-sensitive adhesive.

2. A closeable heat-shielding jacket according to claim 1 wherein the pressure-sensitive adhesive has is an initial lap shear strength of at least 4 kg/cm2 and a lap shear strength that increases upon exposure to elevated temperature.

3. A closeable heat shielding jacket according to claim 1, wherein a polymer coating of the glass fiber textile comprises polyurethane.

4. A closeable heat-shielding jacket according to claim 1 wherein the metal layer comprises aluminum.

5. A closeable heat-shielding jacket according to claim 4 wherein the metal layer comprises a layer of aluminum deposited on a polyester sheet adhered to the polymer-coated woven glass fiber textile.

6. A closeable heat-shielding jacket according to claim 1 wherein the adhesive has a lap shear strength of at least 1.5 kg/cm2 after 48 hours at room temperature.

7. A closeable heat-shielding jacket according to claim 6 wherein the adhesive has an increased lap shear strength after exposure to elevated temperature.

8. A closeable heat-shielding jacket according to claim 1 wherein the adhesive has a lap shear strength that increases to at least 5 kg/cm2 after exposure to elevated temperature.

9. A closeable heat-shielding jacket according to claim 1 wherein the adhesive has a lap shear strength of at least 4 kg/cm2 after 48 hours at room temperature.

10. A closeable heat-shielding jacket according to claim 1 wherein the adhesive is resistant to continuous exposure to at least 150° C.

11. A closeable heat-shielding jacket according to claim 1 wherein the strip of pressure-sensitive adhesive is adhered along one edge of the metal layer.

12. A closeable heat-shielding jacket according to claim 1 wherein the pressure-sensitive adhesive is soft enough to conform to the surfaces of the polymer-coated textile.

13. A closeable heat-shielding jacket according to claim 1 wherein the pressure-sensitive adhesive has a thickness of at least 0.1 mm.

14. A closeable heat-shielding jacket comprising:
    a substantially impervious flexible sheet of polyurethane-coated woven glass fiber textile;
    a layer of polyester coated with reflective aluminum adhered onto one face of the textile;
    a strip of acrylic pressure-sensitive adhesive adhered along one edge of the metal layer, the adhesive being resistant to continuous exposure to at least 150° C., having an initial lap shear strength of at least 4 kg/cm2 and a lap shear strength that increases upon exposure to elevated temperature; and
    a removable release layer over the strip of pressure-sensitive adhesive.

15. A closeable heat-shielding jacket according to claim 14 wherein the adhesive has a lap shear strength that increases to at least 5 kg/cm2 after exposure to elevated temperature.

16. A closeable heat-shielding jacket according to claim 15 wherein the adhesive is soft enough to conform to the textured surfaces of the polymer-coated textile with thumb pressure.

17. A closeable heat-shielding jacket according to claim 14 wherein the adhesive is soft enough to conform to the textured surfaces of the polymer-coated textile with thumb pressure.

18. A closeable heat-shielding jacket according to claim 14 wherein the pressure-sensitive adhesive has a thickness of at least 0.1 mm.

* * * * *